United States Patent [19]

Mantle

[11] 4,151,893
[45] May 1, 1979

[54] WING IN GROUND EFFECT VEHICLE

[75] Inventor: Peter J. Mantle, Alexandria, Va.

[73] Assignee: The United States of America as represented by the Secretary of the Navy, Washington, D.C.

[21] Appl. No.: 831,635

[22] Filed: Sep. 8, 1977

[51] Int. Cl.² .............................................. B60V 1/08
[52] U.S. Cl. ................................. 180/116; 114/67 A; 180/126; 244/23 R
[58] Field of Search .................. 180/116, 126, 129; 244/12.1, 12.5, 12.6, 23 A, 35 R; 114/67 A

[56] References Cited

U.S. PATENT DOCUMENTS

| | | | |
|---|---|---|---|
| 3,117,545 | 1/1964 | Warner | 114/67 A X |
| 3,141,436 | 7/1964 | Cathers | 180/126 X |
| 3,207,245 | 9/1965 | Weiland | 114/67 A |
| 3,269,476 | 8/1966 | Jones | 180/129 |
| 3,379,395 | 4/1968 | Smith | 244/23 A X |
| 3,389,672 | 6/1968 | Winter | 114/67 A |
| 3,476,069 | 11/1969 | Mantle | 180/126 X |
| 3,481,297 | 12/1969 | Mantle | 114/67 A |
| 3,661,111 | 5/1972 | Lippisch | 114/67 A |
| 3,830,179 | 8/1974 | Lippisch | 180/126 X |

FOREIGN PATENT DOCUMENTS

2543737 4/1977 Fed. Rep. of Germany ........ 244/23 R

*Primary Examiner*—Albert J. Makay
*Assistant Examiner*—Terrance L. Siemens
*Attorney, Agent, or Firm*—R. S. Sciascia; A. L. Branning; G. J. Perry

[57] ABSTRACT

A wing in ground effect (WIG) vehicle, the body of which is a low aspect ratio airfoil. Soft end plates allow for proper sealing of pressure below the wing while preventing the transmittal of wave action forces to the vehicle. Fin rudders and a dorsal fin provide turning control. Efflux from the propulsor engines can be split to flow both over and under the wing so that the vehicle will be capable of both rapid movement and hover over both land and water. Two designs are disclosed providing this vehicle with the ability to jump out of ground effect mode to avoid obstacles appearing in its flight path.

20 Claims, 30 Drawing Figures

WING IN GROUND EFFECT VEHICLE

BACKGROUND OF THE INVENTION

The present invention relates to fluid cushion ground effect vehicles and more specifically to such vehicles which derive their lift by the dynamic action of an airfoil.

When a conventional airfoil is operated in a region close to the ground, its normal pressure distribution is distorted. Pressure tends to develop to a higher level under the wing and adds to the normal dynamic lift of the airfoil. This enhanced lift is well known as the ground effect.

There have been several versions of WIG vehicles developed over the years since the first one developed and patented by Finn Toivio Kaario in 1935. Some have had conventional high aspect ratio (AR≧6) wings flying close to the surface, but their large wing span made them impractical machines to operate in geographically restrictive waterways such as harbors. Other versions incorporated low aspect ratio (AR≦2) wing designs to keep the span within practical limits. Because small span wings have low aerodynamic efficiency, end plates were added to these low aspect ratio designs.

End plates, however, become hazardous in that they increase the danger of the wing "digging-in" as the end plates contact the water which becomes increasingly dangerous as speed operating ranges increase to those at which the WIG is most efficient (150 to 200 knots). So the WIG has a dilemma. If it flies high to avoid contacting waves, the "ground effect lift" diminishes rapidly and the WIG loses its advantage and becomes a poor airplane. If it flies low to maintain its aerodynamic advantage the end plates contact the water and high structural loads are imparted to the vehicle. A structure designed to withstand such loads must have increased weight and its consequent reduced payload capacity. In addition, the high structural loads seriously compromise the handling and maneuverability of the craft, thereby increasing the likelihood of pitch-in and capsizing.

Another difficulty experienced by WIG vehicles heretofore has been their inability to turn at high speed, a problem common to all high speed marine vehicles. Air cushion vehicles and surface effect ships have characerisitically large tactical diameters, hampering their military worth. The hydrofoil, in common with the airplane, enjoys smaller tactical diameters because of its ability to bank into a turn thereby producing large turning forces. The conventional WIG cannot bank into a turn because of its low surface clearance. Any attempt to bank at large angles to generate the turning force would cause the edge (tip) of the vehicle to dig in and overturn. This would especially be true of WIG vehicles with hard endplates.

Another disadvantage of most WIG designs is that since they gain their lift aerodynamically, they have no inherent hover capability. Such an added mode of operation designed into the vehicle would make it more useful. In some designs a pseudo hover capability is built in by the addition of floats for buoyancy lift (in water). These floats which also serve as the endplates cause the danger of water contact at high speeds referred to above.

SUMMARY OF THE INVENTION

Accordingly, the present invention provides a wing in ground effect craft able to operate at both high and low speeds and with hover capability. The main body is planform shaped so that its center of lift is very near to its center of gravity thereby eliminating the need for a tail stabilizer section generally found in classical wing vehicle design. Soft endplates at each tip of the airfoil body both enhance aerodynamic efficiency to promote lift and help to seal pressure under the vessel. These soft endplates are in essence a row of pressurized cones depending downward toward the water from a pressurized bag connected to the wing tip and are shaped to minimized aerodynamic drag. A trailing edge flap provides pitch control and helps to seal ground effect pressure and provides stability. Fin rudders control the natural tendency of the craft to pitch up whenever the center of lift moves forward from the center of gravity. Propulsor air engines or fans mounted above the body provide an efflux which flows controllably over and under the wing. Operating in a high speed cruise mode, lift for the vehicle is generated aerodynamically and augmented by any increase circulation due to propulsor efflux passing over the wing. In the hover mode, efflux from the engines ducted underneath of the wing provide a pressure barrier upon which the vehicle can float. This pressure barrier is enhanced by a bow seal which in combination with the other features described provide hover capability over both land and sea. Two endplate design variations provide this vehicle with the ability to jump and fly for short periods of time out of the ground effect to avoid extremely rough seas and land masses or to pop into the air for quick surveillance.

OBJECTS OF THE INVENTION

It is therefore an object of the present invention to provide a WIG vehicle that will operate over water when the water waves are of significant size in relation to the height of the vehicle above the calm water level (a rough sea vehicle).

Another object of the present invention is to provide a WIG vehicle that will hover over both water and land.

Still another object of the present invention is to provide a WIG vehicle having high maneuverability and the ability to turn at high speed.

Yet another object of the present invention is to provide a WIG vehicle with enhanced payload capacity that is structurally compact, rugged and offers design flexibility.

Another object of the present invention is to provide a WIG vehicle that will operate at high speeds without instability.

Still another object of the present invention is to provide a WIG vehicle that is able to jump out of the ground effect and fly for short periods of time.

BRIEF DESCRIPTION OF THE DRAWINGS

Other objects and many of the attendant advantages of the present invention will be readily apparent as the invention becomes better understood by reference to the following detailed description with the appended claims when considered in conjunction with the accompanying drawings wherein:

DESCRIPTION OF THE PREFERRED EMBODIMENT

General Design Features

Figure 1:
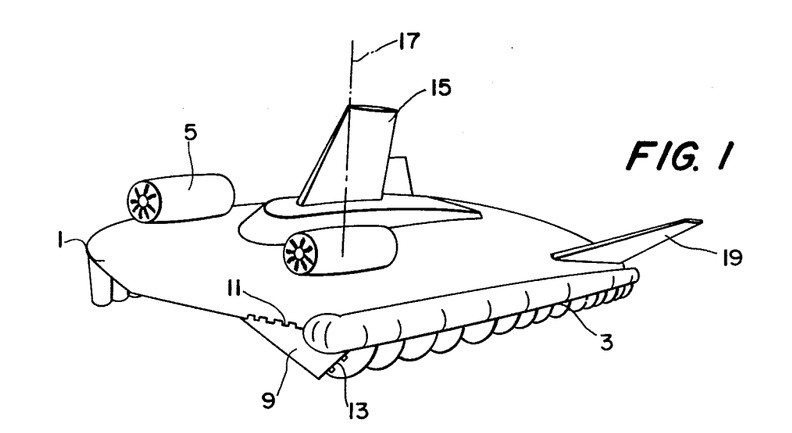
FIG. 1 is a pictorial view of the general features of the WIG vehicle according to the present invention as it moves to the left in its cruise high speed mode.
Figure 2:
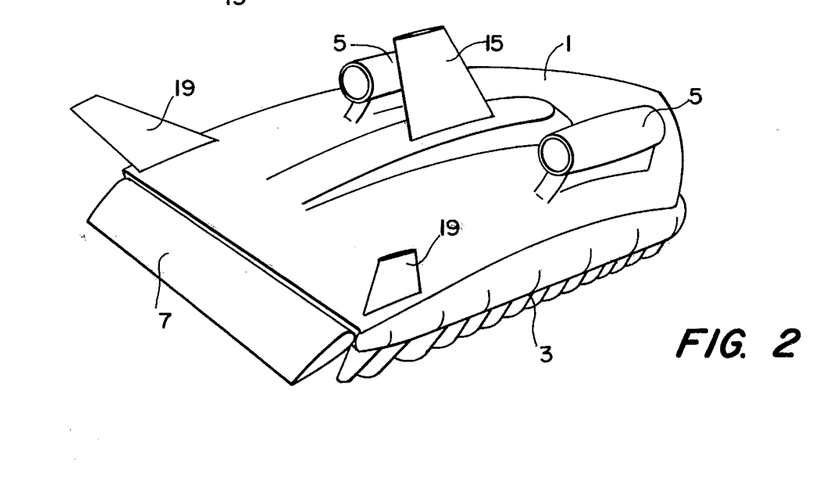
FIG. 2 is a pictorial view of the general features of the WIG vehicle according to the present invention as its moves to the right in its low speed mode.

Referring now to the drawings, wherein like reference numerals designate like or corresponding parts throughout the several views, the basic WIG vehicle design according to this invention is substantially as shown in FIGS. 1 and 2 which are pictorial views.

The main body 1 of the vehicle is essentially a low aspect ratio airfoil of a suitable airfoil section with its geometry for a specific scale size vehicle determined by conventional aerodynamic design procedures. A soft end plate 3 is attached to each tip of the main body airfoil 1. Two propulsors 5 are positioned over the main body airfoil 1 so that their efflux is direct rearward. This efflux may be directed over the main body airfoil 1 or beneath it or split so as to go both over and under the main body by various ducting schemes later described and depending upon the mode of operation. In the low speed mode most of the efflux is directed under the main body airfoil 1, however, in the high speed cruise mode, it is directed entirely over the main body. Although the propulsors are illustrated as jet engines, fans or propellers could be easily substituted based on power needs.

A trailing edge flap 7 shown in its down position in FIG. 2 provides rear enclosure for the pressure region formed beneath the main body airfoil 1 during operation of the craft and gives the pilot a quick responsive pitch control. The sides of this pressure region beneath the main body airfoil 1 are defined by the soft end plates 3 attached to and depending downward form the tips of the main body 1.

During high speed cruise, there is a need for "override" response to restore the vehicle in pitch due to occasional sharp wave contact. This restoration is provided by a planing flap 9 hinged 11 near each tip of the leading edge of main body airfoil 1. This planing flap 9 is shaped similarly to the front part of a conventional planing hull found on many crafts designed to deflect water as they cut through waves. Thus, planing flap 9 will upon being impacted by high waves, induce an upward force to lift the main body airfoil 1 clear of the waves. Hinge 11 is spring loaded so that forces arising from passage through unusually high waves can by relieved. A semi-rigid attachment 13 forms the interface between the soft end plates 3 and planing flaps 9 so that when a planing flap deflects during heavy wave action the first member of its soft endplate will also deflect.

A dorsal fin 15 rotating about a vertical axis 17 near the center of gravity of the craft will upon turning at an angle to the direction of travel generate a large turning force to allow maneuvering of the vehicle in a small tactical diameter. It is therefore not necessary for the craft to bank heavily into a turn. Because this vehicle has soft end plates 3, the very modest banking caused by a turning maneuver will only cause these plates to contact the water on the very sharpest turns, and then they will deform rather than digging in and causing capsizing.

To provide the necessary rotation about the vehicle center of gravity for a coordinated turn, a fin-rudder combination 19 is provided aft of the vehicle center of gravity. These may be fitted fins or controllable rudders depending upon the aerodynamic design of the main body and geometric scaling of the entire vehicle.

Main Body—Planform Shaping

Figure 3:
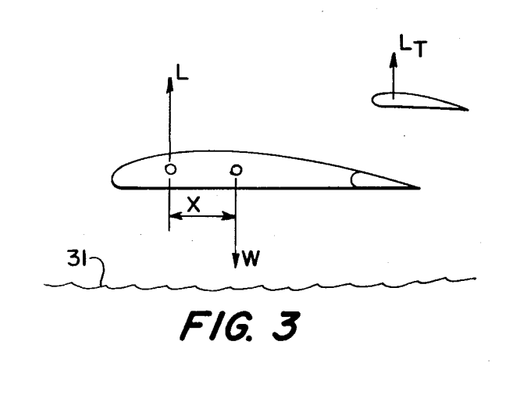
FIG. 3 is a representation of the weight and lift vector forces on airfoils according to classical aerodynamic teachings.
Figure 4:
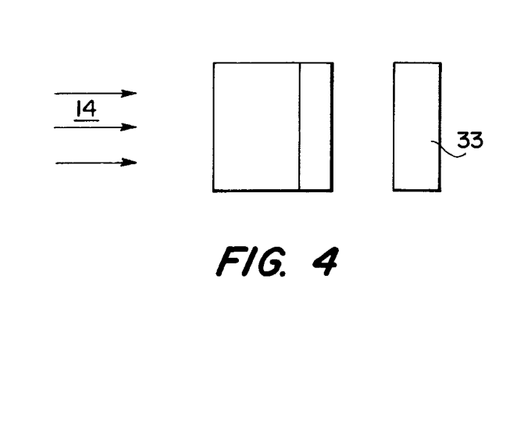
FIG. 4 is the planform diagram of current WIG airfoils.

The planform shaping of the main body airfoil 1 is better understood with reference to FIGS. 3, 4, 5, and 6. FIG. 3 illustrates the classical relationship between the weight (W), lift (L) and horizontal tail lift (Lt) of both WIG and aircraft. The distance (x) between the lift vector (L) and the weight (W) is typically large on WIGs necessitating large horizontal tails to offset the tendency of the wing to pitch up. In addition, as the airfoil begins to pitch up it rises out of the region of ground effect thereby causing the pressures on the wing to assume the distribution of those on a conventional airplane wing. This new pressure distributions force L even further forward, increasing the distance (X) even more. This in turn further increases the tendency of the craft to pitch up away from the surface of the water 31. In current WIG designs, the planform for which is depicted in FIG. 4, an unswept wing surface is used on which the center of aerodynamic lift is approximately at the 25% cord location back from the leading edge. Since the center of gravity of the vehicle tends to be about the 50% cord point, there is a need for large horizontal tail surfaces such as the stabilizer 33 to counteract the large pitch up moments. The existence of this stabilizer 33 is both expensive and extremely vulnerable from a military point of view.

Figure 5:
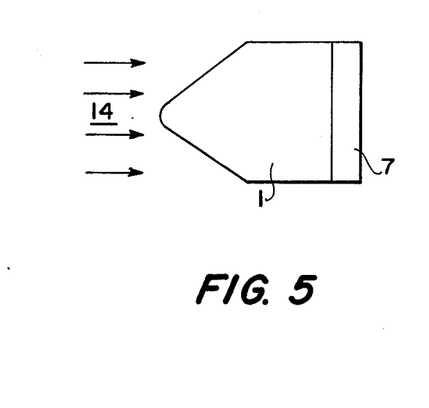
FIG. 5 is the planform diagram of the main body airfoil of the WIG according to the present invention.
Figure 6:
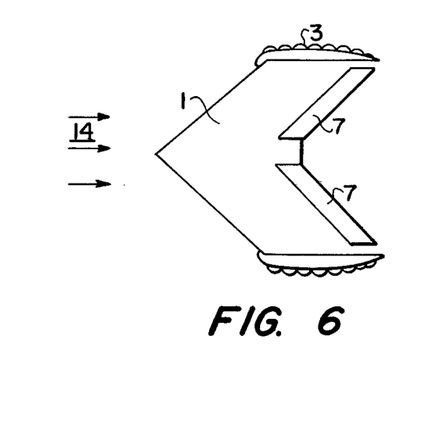
FIG. 6 is a planform diagram of a swept back main body design.

The sweptback planform design of main body airfoil 1 according to the present invention illustrated in FIG. 5 allows the center of aerodynamic lift to move aft, causing the distance between center of lift and center of gravity to be decreased. This reduces the magnitude of the offsetting vector normally supplied by a stabilizer and permits the substitution of the fin-rudders 19 shown in FIGS. 1-2 in its place. FIG. 6 illustrates an alternate planform shape that will also accomplish the required shift in the center of aerodynamic lift. Naturally, other planforms may be used to accomplish the same purpose and can be designed according to known acerodynamic principles.

In addition to the swept back planform design of FIG. 5, the center of lift can be forced aft by making trailing edge flaps 7 into jet flaps. Air for these jet flaps could be ducted from propulsors 5 or supplied from an additional source.

Soft End Plates

Figure 7:
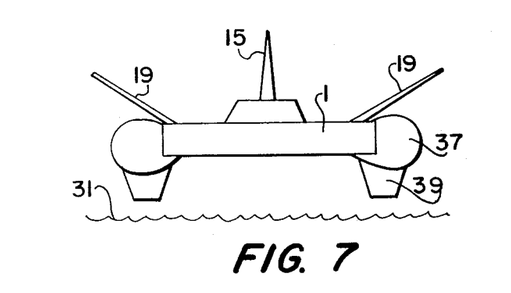
FIG. 7 is a front view of the WIG vehicle according to this invention showing the general design of the soft end plates.
Figure 8:
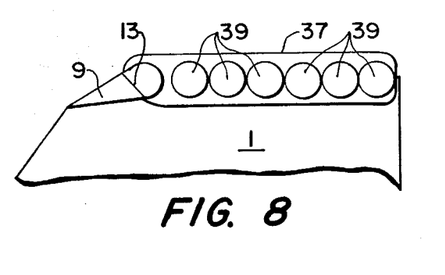
FIG. 8 is an underside of half body view showing the soft end plate cones.
Figure 9:
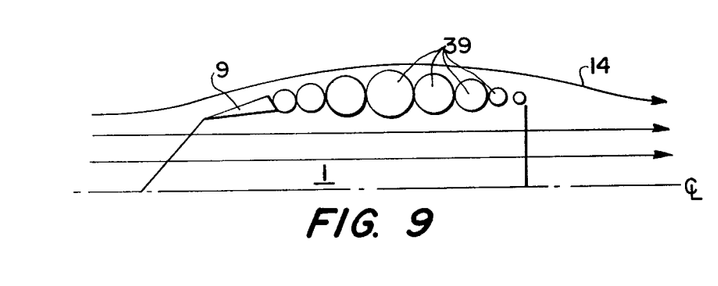
FIG. 9 shows an alternate embodiment of the soft end plates in which the cones are of different diameters.
Figure 10:
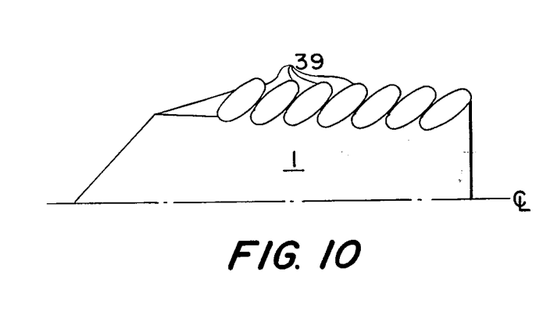
FIG. 10 shows a second alternate embodiment of the soft end plates in which the cones are elliptical.

Referring now to FIG. 7 which is a front view cross section of the WIG vehicle "flying" over water surface 31, the main components of soft end plates 3 are shown. A conduit-like bag 37 connects the main body airfoil 1 to surface following cones 39. Conduit bag 37 and cones 39 are either inflated with air pressure to some preselected values or they can be pressurized through flowing air from a propulsor 5 or a fan source (not shown) within the vehicle. FIG. 8 is an underside view of the vehicle detailing the components of the soft end plates 3. The first of the cones 39 is connected to planing surface 9 by flexible connector 13. FIG. 9 illustrates that the soft end plate 3 geometry can been changed such that the first and last few cones 39 are of different diameters so as to present to the oncoming airstream 14 a quasi-streamline profile to minimize aerodynamic drag. Various cone arrangements can be accomplished either with or without conduit bag 37. FIG. 10 is another alternative soft end plate 3 in which the cones 39 are quasi-elliptical in cross-section and are inclined to the airstream 14. As the speed of the vehicle becomes high the airpressure inside the soft end plates 3 must become increasingly higher to maintain shape against the oncoming airstream 14. Slanting the soft endplates 3 in the manner shown will decrease aerodynamic drag.

Figure 11:
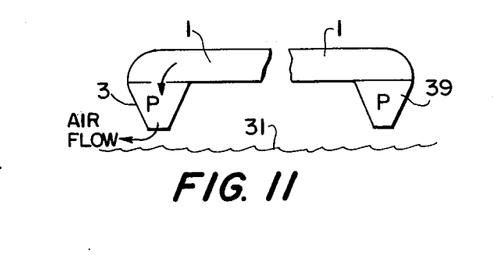
FIG. 11 is a cross sectional view of the soft end plates illustrating two possible schemes for pressurization.
Figure 12:
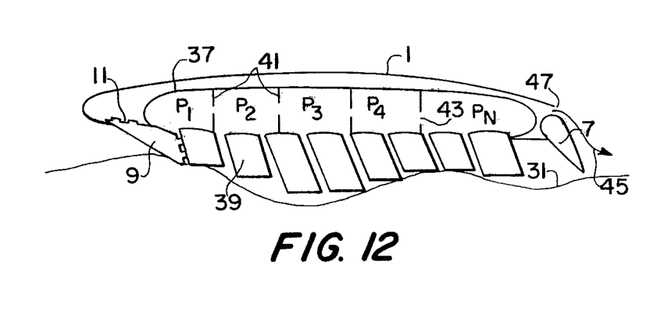
FIG. 12 is a longitudinal section side view showing an alternate end plate embodiment in which the conduit bag is segmented into pressure chambers communicating through orifices.

FIG. 11 is a cross-sectional view of the vehicle showing two possible schemes for pressurizing the soft endplates. In the left-hand part of FIG. 11 the pressure (P) inside the soft endplate is generated from air flow coming from some pressure source (not shown) within the vehicle. This can be bleed air from the main or auxiliary engines or it can be from fans (not shown) provided for the purpose. In the right-hand side of FIG. 11 the pressure (P) is generated within the soft end plate by pumping up the closed cones 39 to a predetermined pressure much like an automobile tire. Thus on the left hand side of FIG. 11 the configuration is of open cones and on the right hand side of FIG. 11 the configuration is of closed cones. These cones could be cylinders and may or may not have conduit bags. The essential features are the same. FIG. 12 is a longitudinal section side-view of the vehicle showing an alternative feature of the soft endplate. The degree of stiffness of the soft endplate 3 can be controlled through the use of diaphragms 41 within the conduit bag 37. These diaphragms contain orifices 43 of varying diameters sized to control the pressure drop between each succeeding section within conduit bag 37. It may be desirable for example to have high pressure $P_1$ in the first section and lower pressures in the succeeding sections such that $P_1 > P_2 > P_3 > P_4 > \ldots > P_N$. By properly sizing orifices 43 other combinations of pressures are possible under the dynamic action of the waves. The cones or cylinders (open or closed) 39 are shown in a slanted position in FIG. 12 as one alternative. The apparent relative lengths are a diagrammatic representation of the extension and compression of the cones 39 as a result of wave action of the water surface 31. For clarity, the trailing edge flap 7 is shown as a jet flap with its airstream 45 in FIG. 12.

If an air supply is used to pressurize the soft endplates, it may also be used to supply the jet flap airstream 45. The gap 47 for the jet flap 7 may be controllable by the pilot to control mass flow for aerodynamic optimization.

Other alternatives for the soft endplates might be versions of air cushion vehicle skirt systems such as "bag-finger" and "loop-segment" (known schemes within the air cushion vehicle industry).

Propulsor Efflux

There are several schemes available for directing propulsor efflux over and under main body airfoil 1 (i.e. shrouded and unshrouded propellers, ducted fans, jet exhausts, compressor bleeds and other means) and it is not intended that this invention be limited to any one of these in particular.

Figure 13:
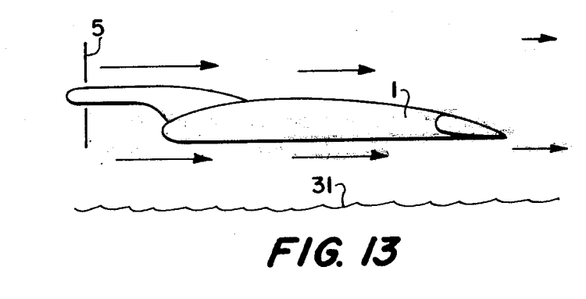
FIG. 13 is a pictorial view of a classic propulsor wing design.
Figure 14:
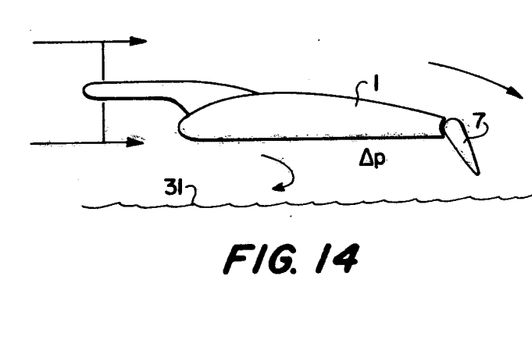
FIG. 14 is a pictorial view of a classic propulsor wing design ground effect vehicle operating in a low speed mode.
Figure 15:
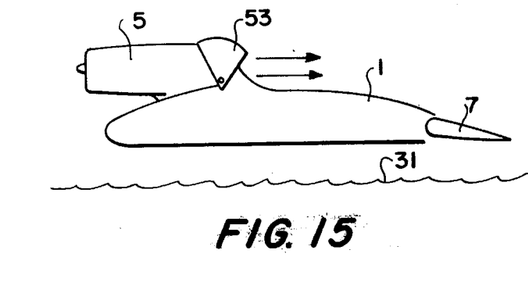
FIG. 15 is a side view of the propulsor engine operating in a high speed cruise mode.
Figure 16:
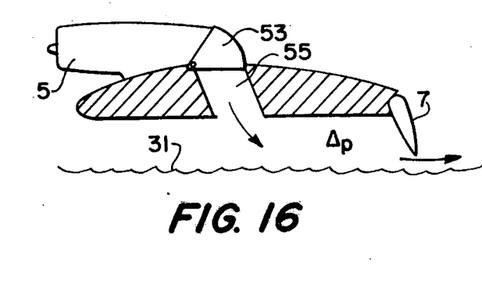
FIG. 16 is a side cut away view of the propulsor engine operating in the hover mode.

FIG. 13 illustrates the general characteristics of a propulsor 5 (shown here as a propller for illustration only) with its slipstream passing over the main body airfoil 1 of a vehicle operating in a high speed cruise mode. All other features of the invention such as soft endplates are omitted for clarity in the illustration. FIG. 14 is the same configuration operating in a low speed or hover mode i.e., with the trailing edge flap 7 shown in the down position so that the propulsor efflux is constrained when flowing under main body airfoil 1 and exiting underneath the trailing edge flap 7 such that a pressure rise ($\Delta p$) is experienced sufficient to lift the vehicle in the hover mode. FIG. 15 more clearly illustrates the engine configuration of the basic WIG design according to this invention. In the high speed cruise mode, as shown, a clam-shell 53 is in its "up" position and propulsor 5 efflux passes over main body airfoil 1. Lift for main body airfoil 1 is generated aerodynamically and augmented by any increased circulation incurred by the jet efflux passing over the it. FIG. 16 shows the same configuration in a low speed or hover mode where now clam-shell 53 and the trailing edge flap 7 are shown in the "down" position. In this mode of operation jet efflux from the propulsor 5 is directed through internal ducting 55 within the main body airfoil 1 to the region beneath the main body. This deflected jet efflux now pressurizes the region to a pressure $\Delta p$ sufficient to lift the vehicle.

Other schemes not illustrated include directed compressor air or ducted fan air beneath the main body airfoil 1 in similar manner to that shown in FIG. 16. The essential features of this invention are not changed by the particular form of propulsor used in any particular vehicle design.

Hover Capability

A major problem associated with WIG design has been the provision for hover and low speed capability. Since the WIG is basically a dynamic vehicle deriving its lift from the forward momentum of its body airfoil, it is hampered at zero and low speed in its ability to maintain control and stability. If it is configured in an airplane fashion then it must have forward speed before the aerodynamic controls have sufficient power to stabilize and control the vehicle. Current designs dictate that speeds approaching 100 knots and "take-off runs" of several thousand feet are required down the waterway before the vehicle is controllable.

Specifically there are two fundamental shortcomings of current WIG designs:

(1) Having no hover capability restricts the capability of the craft to maneuver in close harbours or to operate at slow speed over land and around personnel, buildings, etc. It requires a "take-off" run much like a landplane or a seaplane. This is in contradistinction to the hovercraft which can maneuver in close quarters, requires no runway or take-off run.

(2) Also, because it is a dynamic interface vehicle it requires a minimum control speed much like an airplane (50-100 knots) before the aerodynamic controls become effective.

Figure 17:
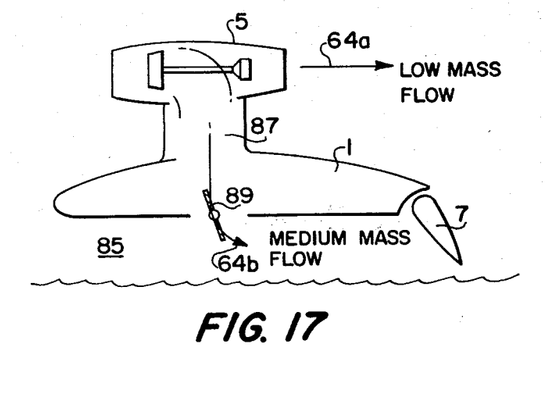
FIG. 17 is a pictorial view of a jet engine installation in which efflux is directed into the cushion area through the wing body.

FIG. 17 shows a propulsor engine installation 5 on the main body airfoil 1. Instead of the engine being mounted forward with its efflux 64 flowing back over the main body 1; the efflux is directed all or in part into the cushion area 85 through the main body airfoil 1. This particular arrangement has a side benefit in allowing the engine to be mounted further removed from spray. The engine(s) can also be placed at the designer's choice to help control the balance of the craft. This arrangement may or may not require a horizontal tail depending on the planform shaping of main body airfoil 1. The effect of ducting the efflux in this manner is essentially the same as the earlier arrangement, i.e. it pressurizes the cushion area 85 to lift the craft.

In the low speed mode the efflux 64 is divided into two streams. Stream 64$a$ is the low mass flow from the turbine to provide modest thrust. The remainder of the mass flow 64$b$ from the compressor or by-pass fan is directed into the cushion area 85 via a cushion duct 87 and a cushion valve 89. The trailing edge flap 7 is in the down position to retain the cushion pressure together with the end plates 3.

Figure 18:
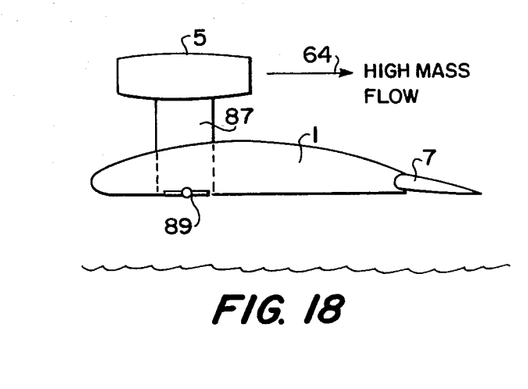
FIG. 18 is a pictorial view of a jet engine WIG vehicle operating in the high speed mode showing all engine efflux passing over the wing body.

FIG. 18 is the same configuration except that now it is in the high speed mode where all the efflux 64 is directed aft to provide maximum thrust. The trailing-edge flap 7 is up and the cushion valve 89 is closed for aerodynamic efficiency. The entire weight of the craft is supported by the aerodynamic lift of the main body airfoil 1 in the conventional manner.

Figure 19:
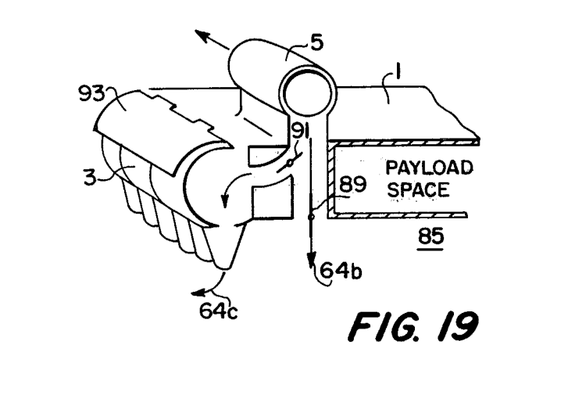
FIG. 19 is a partial cut away view of a jet engine WIG vehicle in which part of the engine efflux is used to pressurized the soft end plates.
Figure 20:
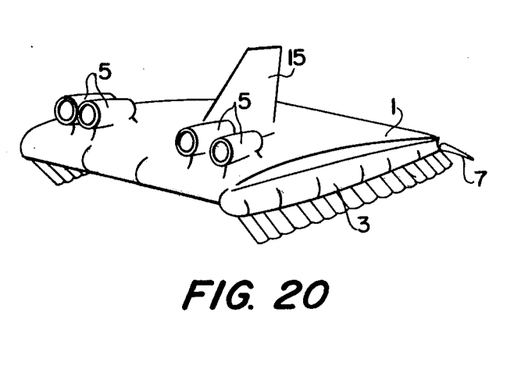
FIG. 20 is a perspective view of the jet engine WIG vehicle.

FIG. 19 shows an arrangement whereby the efflux 64$b$ can be bled off partially to provide pressurized air 64$c$ to inflate the soft plates 3. A bleed valve 91 controls the amount of bleed required. FIG. 20 shows diagrammatically how such a configuration might look in operation.

Figure 21:
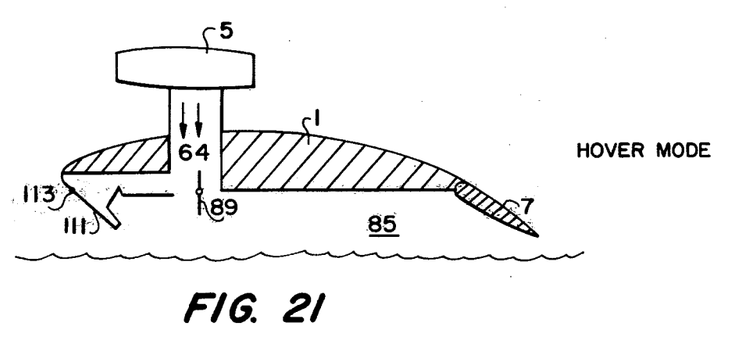
FIG. 21 is a side cut away view of a jet engine WIG having a hinged bow seal flap and operating in the "hover mode."
Figure 22:
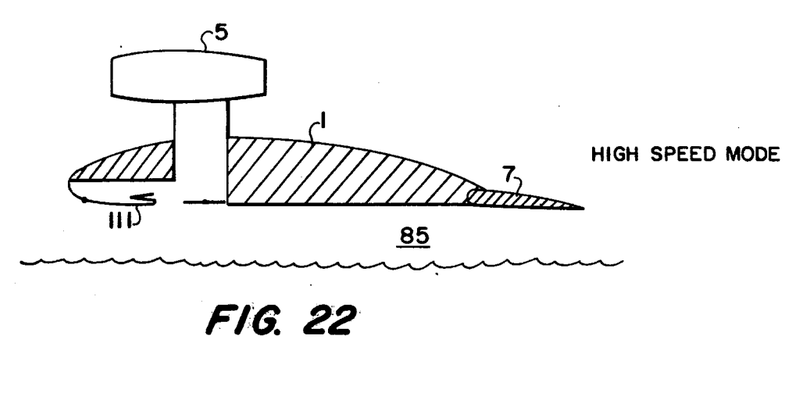
FIG. 22 is a side cut away view of a jet engine WIG having a hinged bow seal flap and operating in the high speed mode.

FIGS. 21 and 22 show an additional feature enhancing hover capability. The engine arrangement of FIG. 21 is the same as that of FIG. 17 except that a bow seal flap 111 has been added, hinged at point 113. With the bow seal flap 111 extended in the down position pressurized air bled from the engine 5 will provide an air seal across the bow of the craft. This bow seal 111 together with the trailing edge flap 7 and the end plates 3(not shown in this view) form a box around the cushion region 85. The cushion volume is now contained and pressurized by the ducted efflux 64 from the propulsors 5. The craft will now rise and hover statically without the need for forward motion. In this mode it acts much like a hovercraft and can be stabilized and controlled like a hovercraft. If hard end plates are used then static stability is achieved through the combination of aerostatic forces in the cushion 85 and the hydrostatic forces on the end plates 3. In this regard it acts like a surface effect ship. If soft end plates are used then the static balance is achieved aerostatically like an amphibious air cushion craft. If pericell like soft end plates are used no cushion divider will be required to provide static stability. NOTE: Other bow seal configurations are possible without compromising the basic features of this invention. See U.S. Pat. No. 3,481,297 to P.J. Mantle entitled "Multi-Mode Variable Geometry Surface Effect Ship" issued Dec. 2, 1969. FIG. 22 shows the bow seal retracted for high speed mode flight.

Jumping Capability

WIG vehicles have heretofore been designed either as airplanes having the added ability to cruise in ground effect or designed to remain in ground effect with no out of ground effect flight capability. Both design approaches have disadvantages. The WIG that is designed to operate for significant periods of time out of ground effect must have the characteristics of an efficient airplane. This implies conventional aircraft configurations with relatively high aspect ratio wings. Also, for the aircraft-like configuration it must also have a large horizontal tail to provide sufficient stability and control when operating at the low speeds (for an airplane) when operating in ground effect. Thus such a configuration must carry weight penalties in both out of ground effect and in ground effect operation. Conversely, the WIG that must stay in ground effect is limited somewhat operationally when large obstacles such as islands, rough sea, etc., appear on the flight path.

This WIG vehicle design, depicted generally in FIGS. 1-2, however allows for optimization for cruising in ground effect while maintaining the ability to climb out of ground effect on those small number of occasions (approx. 5% of its operating mission profile) when the need arises. It is therefore the intent of this feature not to optimize for out of ground effect cruise but to have a stable configuration such that when boost power is applied it can operate for small periods of time (hence the phrase, "jump") at some nominal altitude, (e.g., 20 to 200 feet) sufficient to clear the obstacle. Such a feature allows all the low aspect ratio compact features discussed above to be retained in the vehicle yet still retain the stability to fly out of ground effect when the occasion demands. The nature of the configuration to accomplish this feature depends on whether hard or soft endplates are incorporated into the design and therefore two alternatives are shown.

Clearly, if such a configuration is to "jump" out of ground effect even for a short time and fly at any appreciable speed, say 200 to 400 knots, the aerodynamic drag of the soft end plates becomes untenable and a means is required to retract them during this mode.

Figure 23:
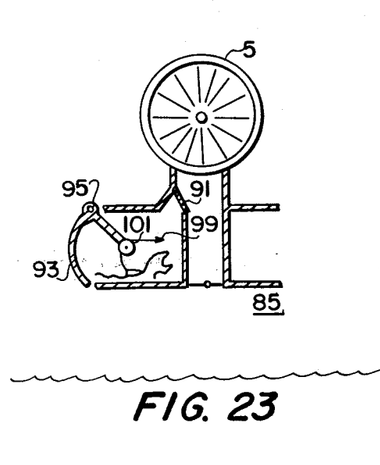
FIG. 23 is a front cut away view of a jet engine WIG vehicle illustrating soft end plate retraction.
Figure 24:
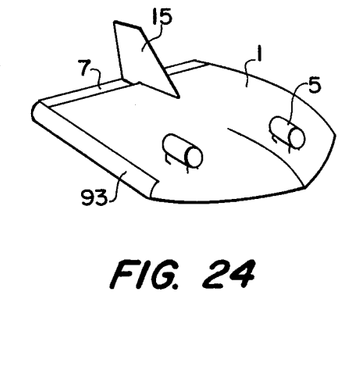
FIG. 24 is a prespective view of a WIG vehicle having retractable soft end plates operating in the retract mode.
Figure 25:
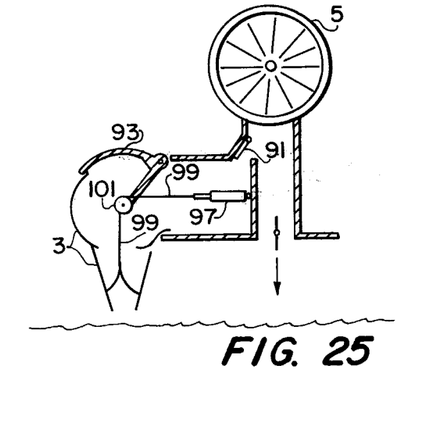
FIG. 25 is a front cut away view of the retractable soft end plate mechanism showing the soft end plates in use.
Figure 26:
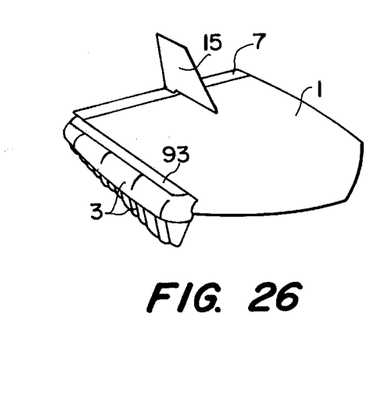
FIG. 26 is a perspective view of the WIG vehicle having retractable soft end plates operating with the soft end plates in use.

FIGS. 23–26 illustrate the soft end plate scheme for accomplishing this end plate retraction. FIG. 23 shows the configuration in the out of ground effect mode where the soft end plates 3 are retracted and covered by a hinged cover 93. This cover is hinged at 95. The closing is effected by some activator 97 shown in FIG. 25 that pulls on the soft endplates 3 via a cable 99 around a pulley 101. Operating in this mode, the vehicle appears as shown in FIG. 24. FIG. 25 shows the arrangement in the ground effect mode where the soft end plates 3 are inflated and acting as walls for cushion region 85. Operating in this mode, the vehicle appears as shown in FIG. 26.

Figure 27:
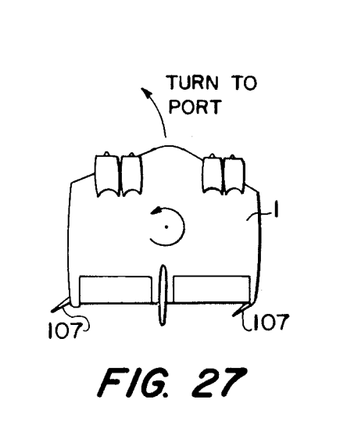
FIG. 27 is a top view of the hard end plate WIG operating in the waterborne ground effect mode.
Figure 28:
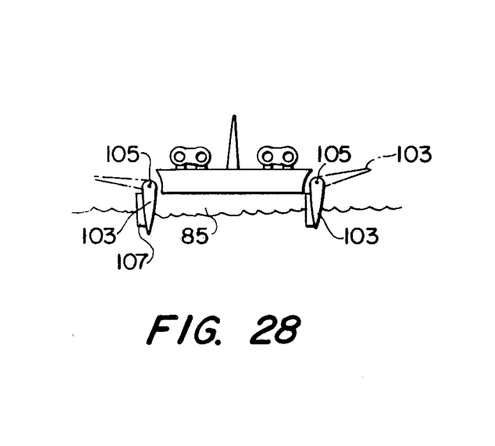
FIG. 28 is a front view of the hard end plate WIG operating in the waterborne ground effect mode.

A "hard end plate" design for providing the jump capability is illustrated in FIGS. 27–30. FIGS. 27 and 28 show the hard end plate WIG in the ground effect waterborne mode. In this hard end plate version the hard end plates 103 are now hinged at point 105. These hard end plates 103 also contain controls called for convenience, "rudderons" 107. When the hard end plates 103 are in the down position for normal in ground effect cruise the rudderons 107 provide the necessary turning mechanism. In FIG. 27 the rudderons 107 are shown for a turn to port.

Figure 29:
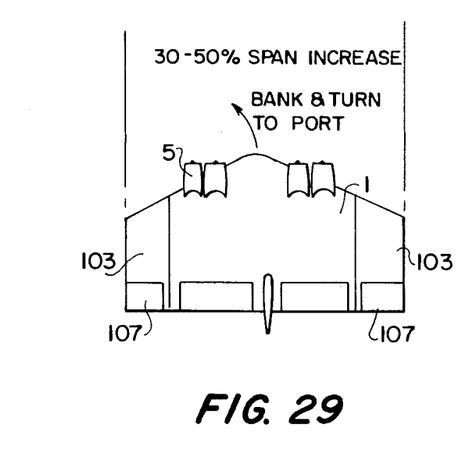
FIG. 29 is a top view of the hard end plate WIG operating in the jumping mode.
Figure 30:
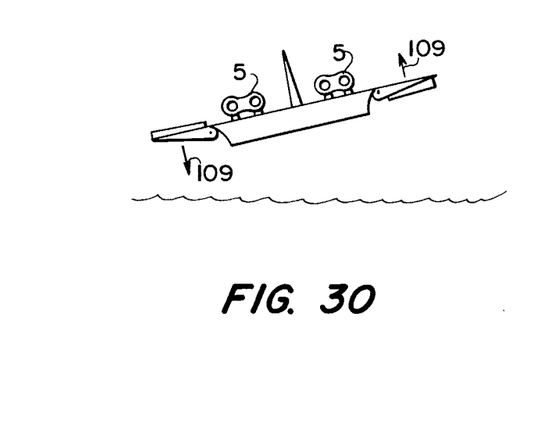
FIG. 30 is a front view of the hard end plate WIG operating in the jumping mode.

FIGS. 29–30 shows the same configuration in the out of ground effect or "jumping" position and provide an increase in span. Practical designs are in the 30%–50% increase in span capability. This increase in span is the feature that provides the increased areodynamic efficiency needed to offset the loss of lift incurred by flying away from the surface and losing the "ground effect" lift. Such a configuration will only provide modest improvements in lift compared to a conventional high aspect ratio wing of the aircraft and it would not be economical for prolonged cruise, but it will provide the necessary lift for short duration climbs over obstacles. Hence, the term "jumping".

FIGS. 29–30 also show the rudderons 107 deflected in the same physical position as in FIGS. 27–28. While in this same deflected position, the banking forces 109 provide the same turning (to port) as when in the ground effect mode. This means the control system provides the same turning characteristics both in ground effect and out of ground effect an important consideration in any practical design.

There has therefore been provided a WIG vehicle having many advantages and new features.

Planform shaping and the use of tail flaps moving the center of lift of the vehicle close to the center of gravity minimize the tendency of the craft to pitch up thereby eliminating the need for large horizontal stabilizers. In their place "bonanza aircraft" type fin rudders used in combination with a dorsal fin provide cordinated turns in a small radius without the need for banking. The use of soft deformable end plates depending down from the wing tips used in combination with a forward bow seal and engine efflux ducted under the wing provide the vehicle with a hover capability over both sea and land. In addition, two end plate retraction schemes allow the vehicle to jump out of the ground effect and fly for short periods of time.

Obviously other embodiments and modifications of the present invention will readily come to those of ordinary skill in the art having the benefit of the teachings presented in the foregoing description and the drawings. It is therefore to be understood that this invention is not to be limited thereto and that said modifications and embodiments are intended to be included within the scope of the appended claims.

What is claimed and desired to be secured by Letters Patent of the United States is:

1. A ground effect vehicle comprising:
    an airfoil body having a leading edge, a trailing edge, and two tips said airfoil body shaped such that the center of its aerodynamic lift is substantially aligned with the center of gravity of the vehicle;
    means for controlling airflow around the tips of said airfoil body
    at least one propulsor mounted above said airfoil body;
    means for directing the efflux from said propulsor over and under said airfoil body in any relative proportion desired;
    means for generating torque about the vertical axis through the center of gravity of said vehicle to provide turning ability;
    means for stabilizing said vehicle during turning maneuvers;
    means for precisely aligning the center of aerodynamic lift with the center of gravity of said vehicle thereby preventing pitch up; and
    means for controlling pressurized gases below said airfoil body so that gases do not rapidly escape to the rear of said airfoil body thereby enhancing hover capability.

2. The vehicle of claim 1 further including hinged flap means for restoring the pitch of said vehicle after impact of said vehicle with a water surface.

3. The vehicle of claim 2 wherein said hinged flap means is a pair of planing flaps hinged to said leading edge of said airfoil body near each of said tips of said airfoil body.

4. The vehicle of claim 1 wherein said means for controlling air flow around the tips of said airfoil body are soft end plates.

5. The vehicle of claim 4 further including means for retracting said soft end plates within said airfoil body.

6. The vehicle of claim 1 wherein said means for precisely aligning the center of aerodynamic lift with the center of gravity of said vehicle is a trailing edge flap.

7. The vehicle of claim 6 wherein said trailing edge flap is a jet flap.

8. The vehicle of claim 1 wherein said means for generating turning torque about the vertical axis through the center of gravity of said vehicle is a dorsal fin.

9. The vehicle of claim 1 wherein said means for stabilizing said vehicle during turning maneuvers is a pair of fin rudders.

10. The vehicle of claim 9 wherein each of said fin rudders is mounted near the junction of the trailing edge of said airfoil body with one of said tips, said rudders mounted in fin-like fashion.

11. The vehicle of claim 1 further including continuously controllable angle front seal means for controlling pressurized gases below said airfoil body so that said gases do not rapidly escape to the front of said airfoil body thereby enhancing hover capability.

12. The vehicle of claim 11 wherein said continuously controllable angle front seal means for controlling pressurized gases below said airfoil body is a valve seal flap.

13. A ground effect vehicle comprising:
an airfoil body;
at least one propulsor mounted above said airfoil body;
means for directing the efflux from said propulsor over and under said airfoil body;
a rotatable dorsal fin mounted near the vertical axis of the center of gravity of said vehicle;
soft end plates that deform when contacting an unforgiving surface mounted at each tip of said airfoil body; and
means for retracting said soft end plates into said airfoil body.

14. The vehicle of claim 13 wherein said soft end plates comprise:
a pressurized conduit-like bag connected to said airfoil body; and
a plurality of hollow cones made of pliant material depending from said bag and deriving internal pressure through nozzles between said bag and each of said cones.

15. The vehicle of claim 14 wherein said bags and cones are pressurized through flowing air from a fan source within said vehicle.

16. The vehicle of claim 14 wherein said bags and cones are pressurized to a preselected value and sealed off so that no air flows into or out of said bags and cones during vehicle operation.

17. The vehicle of claim 14 wherein said bags and cones are pressurized by efflux from said propulsor.

18. The vehicle of claim 14 wherein said conduit like bag is divided into a series of compartments each separated from those adjacent to it by a diaphragm and valve so that air flow between adjacent compartments can be controlled thereby creating a pressure gradient from one compartment to another.

19. The vehicle of claim 18 wherein each cone is coupled to only one such compartment and derives its pressure therefrom.

20. A ground effect vehicle comprising:
an airfoil body;
at least one propulsor mounted above said airfoil body;
means for directing the efflux from said propulsor over and under said airfoil body;
a rotatable dorsal fin mounted near the vertical axis of the center of gravity and said vehicle; and
hard endplates hinged mounted from the tips of said airfoil body so that said hard end plates can be controlled to either extend outwardly from said airfoil body or dependend downward perpendicular to said airfoil body.

* * * * *